(12) United States Patent
Biran et al.

(10) Patent No.: US 10,469,340 B2
(45) Date of Patent: Nov. 5, 2019

(54) TASK EXTENSION FOR SERVICE LEVEL AGREEMENT STATE MANAGEMENT

(71) Applicant: ServiceNow, Inc., Santa Clara, CA (US)

(72) Inventors: Noam Biran, Kfar Menahem (IL); Ofer Gati, Netanya (IL)

(73) Assignee: ServiceNow, Inc., Santa Clara, CA (US)

( * ) Notice: Subject to any disclaimer, the term of this patent is extended or adjusted under 35 U.S.C. 154(b) by 196 days.

(21) Appl. No.: 15/492,958

(22) Filed: Apr. 20, 2017

(65) Prior Publication Data

US 2017/0310563 A1    Oct. 26, 2017

Related U.S. Application Data

(60) Provisional application No. 62/325,812, filed on Apr. 21, 2016.

(51) Int. Cl.
*G06F 15/173* (2006.01)
*H04L 12/24* (2006.01)

(52) U.S. Cl.
CPC ........ *H04L 41/5035* (2013.01); *H04L 41/065* (2013.01); *H04L 41/5012* (2013.01)

(58) Field of Classification Search
CPC  H04L 41/065; H04L 41/5012; H04L 41/5035
USPC ......................................................... 709/226
See application file for complete search history.

(56) References Cited

U.S. PATENT DOCUMENTS

| | | | |
|---|---|---|---|
| 6,449,588 B1 * | 9/2002 | Bowman-Amuah | ........................ H04L 41/0604 703/17 |
| 7,600,007 B1 | 10/2009 | Lewis | |
| 9,311,376 B2 * | 4/2016 | Narasayya | .......... H04L 41/5009 |
| 9,843,486 B2 * | 12/2017 | Feller | .................. H04L 41/5009 |
| 2009/0240510 A1 * | 9/2009 | Hopkins | ................ G06Q 10/06 705/1.1 |
| 2010/0299153 A1 | 11/2010 | Curtis et al. | |
| 2011/0307291 A1 | 12/2011 | Rolia et al. | |

(Continued)

OTHER PUBLICATIONS bmc.com, "SLA Compliance Processing", BMC Service Level Management 8.1—BMC Documentation, last modified Jun. 18, 2013, https://docs.bmc.com/docs/display/public/SLM81/SLA+compliance+processing, Downloaded Feb. 17, 2017, 2 pp.

(Continued)

*Primary Examiner* — Phuoc H Nguyen
(74) *Attorney, Agent, or Firm* — Fletcher Yoder PC

(57) ABSTRACT

Breaches of service level agreements (SLAs) of a computer network can be identified based on changes to statuses of components of the computer network. A status of a component of the computer network can be determined to have changed responsive to an event affecting the computer network. The component can be determined to be included in a list of components used to meet conditions of the SLAs. A record of a task table can be updated according to the changed status of the component responsive to determining that the component is included in the list of components. Records of the task table are associated with ones of the SLAs. It can then be determined that the changed status of the component prevents a condition of an SLA associated with the updated record from being met. The SLA can be identified as breached responsive to that determination.

17 Claims, 7 Drawing Sheets

(56) References Cited

U.S. PATENT DOCUMENTS

| | | | |
|---|---|---|---|
| 2012/0016706 A1 | 1/2012 | Pargaonkar et al. | |
| 2012/0259962 A1* | 10/2012 | Bose | H04L 41/50 709/223 |
| 2014/0149584 A1 | 5/2014 | Hwang | |
| 2014/0310401 A1* | 10/2014 | Thomas | G06F 9/50 709/224 |
| 2016/0162382 A1* | 6/2016 | Devin | G06F 11/3034 702/186 |
| 2016/0210172 A1* | 7/2016 | Ramachandra | G06F 9/5072 |

OTHER PUBLICATIONS oracle.com, "Business Transaction Management Online Help—Monitoring SLA Compliance", Date Unknown, https://docs.oracle.com/cd/E24628_01/doc.121/e26585/alerts005.htm#CIHIEIDF, Downloaded Feb. 17, 2017, 2 pp.

* cited by examiner

TASK TABLE 500

| SYSTEM ID | TASK ID | IDENTIFIED | SERVICE |
|---|---|---|---|
| 4893102 | 0010013 | 20160422_10:20:44 | EMAIL |
| 7235819 | 0010014 | 20160422_10:22:28 | NETWORK |
| 8124905 | 0010015 | 20160422_10:31:57 | FINANCIAL |

TASK CI TABLE 510

| SYSTEM ID | CI ID | SEVERITY | SERVICE |
|---|---|---|---|
| 4893102 | HPOM9 | MINOR | EMAIL |
| 7235819 | HPOM12 | MAJOR | NETWORK |
| 8124905 | AMM7 | CRITICAL | FINANCIAL |

TASK SLA TABLE 520

| SYSTEM ID | SLA ID | DURATION | STATE |
|---|---|---|---|
| 4893102 | EVT_MG_SLA1 | 1:0:00:00 | IN PROGRESS |
| 7235819 | EVT_MG_SLA4 | 0:6:00:00 | PAUSED |
| 8124905 | EVT_MG_SLA7 | 0:1:30:00 | BREACHED |

FIG. 5

TASK EXTENSION FOR SERVICE LEVEL AGREEMENT STATE MANAGEMENT

CROSS-REFERENCE TO RELATED APPLICATION(S)

This application claims the benefit of U.S. Provisional Application No. 62/325,812, filed Apr. 21, 2016, the disclosure of which is hereby incorporated by reference in its entirety.

BACKGROUND

Computing networks can be used for exchanging and storing data. Proper maintenance of infrastructures of computing networks can enable the infrastructures and networks to operate with limited interruption. Beyond standard maintenance, the health and status of the hardware and software resources of services provided by a computing infrastructure can be monitored using monitoring tools. Monitoring tools can, for example, alert system administrators and remediation programs to potential issues so that repairs, updates, or other needed actions can promptly be attended to. Monitoring tools also perform other useful functions, such as helping system administrators to manage system resources, process open incidents, and make system configuration decisions.

SUMMARY

Disclosed herein are implementations of systems and techniques for task extension for SLA state management.

In an implementation, a system is provided for identifying breaches of service level agreements (SLAs) of a computer network based on changes to statuses of components of the computer network. The system comprises a memory and a processor. The memory includes instructions executable by the processor to determine that a status of a component of the computer network has changed responsive to an event affecting the computer network. The memory further includes instructions executable by the processor to determine that the component is included in a list of components used to meet conditions of the SLAs. The memory further includes instructions executable by the processor to update a record of a task table according to the changed status of the component responsive to a determination that the component is included in the list of components, wherein records of the task table are associated with ones of the SLAs. The memory further includes instructions executable by the processor to determine that the changed status of the component prevents a condition of an SLA associated with the updated record from being met. The memory further includes instructions executable by the processor to identify the SLA as breached.

In an implementation, a method is provided for identifying breaches of service level agreements (SLAs) of a computer network based on changes to statuses of components of the computer network. The method comprises determining that a status of a component of the computer network has changed responsive to an event affecting the computer network. The method further comprises determining that the component is included in a list of components used to meet conditions of the SLAs. The method further comprises updating a record of a task table according to the changed status of the component responsive to determining that the component is included in the list of components, wherein records of the task table are associated with ones of the SLAs. The method further comprises determining that the changed status of the component prevents a condition of an SLA associated with the updated record from being met. The method further comprises identifying the SLA as breached.

In an implementation, a non-transitory computer-readable storage medium is provided. The non-transitory computer-readable storage medium comprises processor-executable routines that, when executed by a processor, facilitate a performance of operations. The operations comprise determining that a component of a computer network is used to perform a task in accordance with an service level agreement (SLA) of the computer network. The operations further comprise determining that the SLA is breached responsive to a determination that a change in status of the component prevents the task from being performed in accordance with the SLA.

These and other aspects of this disclosure are disclosed in the following detailed description, the appended claims, and the accompanying figures.

BRIEF DESCRIPTION OF THE DRAWINGS

The description herein makes reference to the accompanying drawings, wherein like reference numerals refer to like parts throughout the several views.

FIG. 5 is an illustration of an example of a task table.

DETAILED DESCRIPTION

Figure 1:
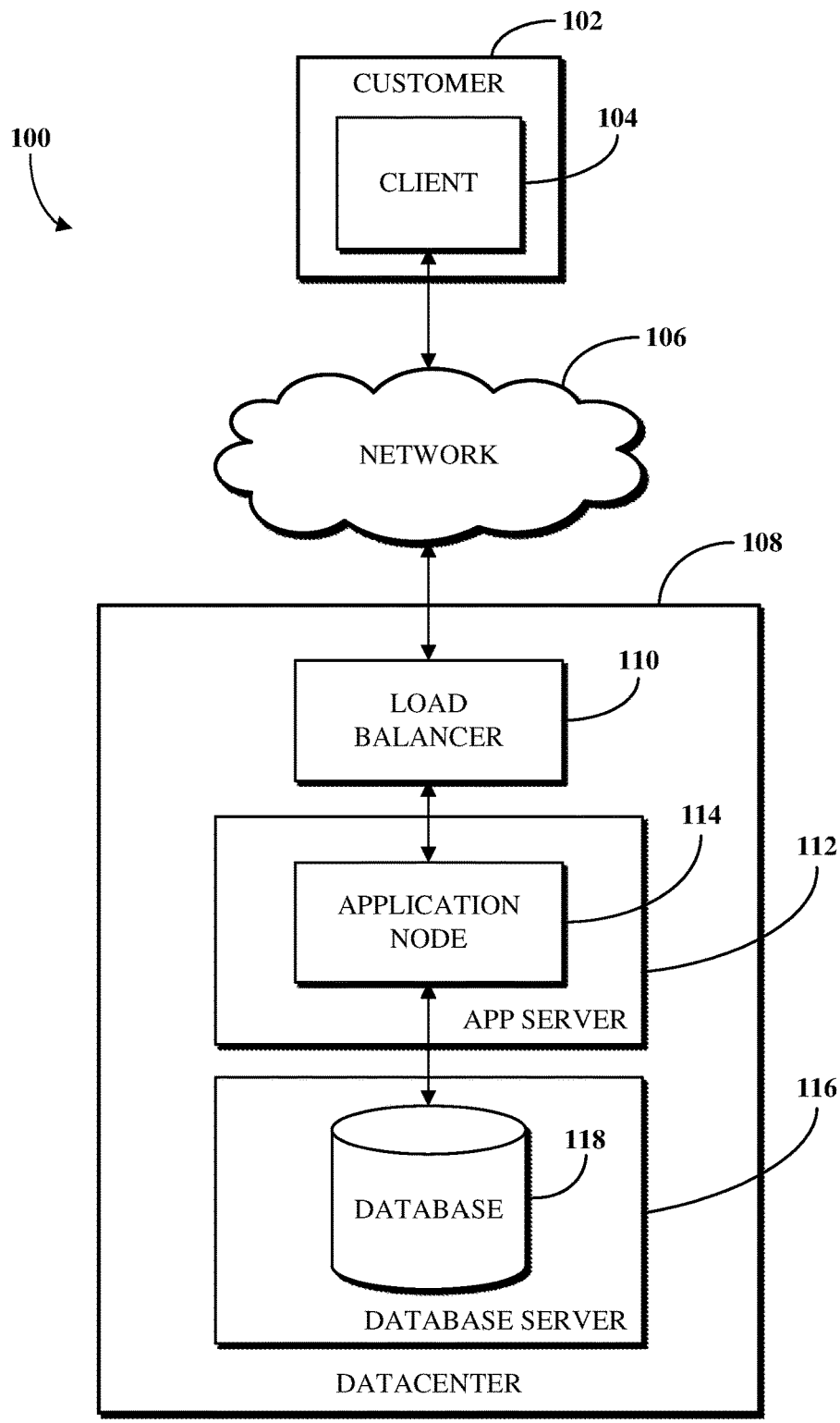
FIG. 1 is a block diagram of an example of an electronic computing and communications system.

Generally, SLAs are used to define the agreed upon standards for providing a service, such as scope, quality, and responsibility. One common aspect of an SLA is defining the available of a service, or, conversely, the permitted downtime of a service. SLAs can be managed in a computerized system, such as in the context of an information technology service management (ITSM) system.

In an exemplary system, an SLA can be represented using records representative of a condition to be reached with respect to a computing network task (e.g., an open incident or action item to be addressed) and a specified period of time for satisfying the condition. Thus, an SLA can indicate whether a condition associated with a task has been timely satisfied. In the event that the condition of the task is not satisfied prior to the expiration of the specified period of time, the SLA can be considered to be breached. For example, where an SLA represents a task for resolving an open incident for an email service within two business days following the generation of the task, the SLA is considered breached if the incident is not resolved before the third business day following the generation of the task.

Tasks associated with SLAs typically relate in some way to resources of a computing network infrastructure. For example, a task or SLA may specify that a particular network resource be involved in the completion of the task or condition the satisfactory resolution of the SLA based on the involvement of the resource. This may be the case, for example, where the task is to bring an email client back online when errors cause it to not function as intended. The status of resources directly or indirectly usable for completing a task can be monitored based on impact calculation operations performed for records of a configuration management database (CMDB), which records can be representative of individual resources or collections of resources within or usable by the computing network infrastructure. In some systems, SLAs can only be defined for tasks and not CMDB records. In such a system, records (e.g., configuration items, or CIs) in a CMDB cannot be managed for SLA performance, for example, to indicate when an SLA condition is being met or when an SLA has been breached.

Implementations of the present disclosure describe systems and methods for determining states of SLAs based on the performance of an impact calculation operation by extending task data in an ITSM-based system to CIs. SLAs can be generated and associated with tasks to be completed within an instance of a computing network, and alerts identified with respect to resources usable within or by the instance can also be associated with tasks. In an implementation, a task table can be used to store and maintain data indicative of task records generated in connection with the system along with SLA records and CI records associated with the task records. In this way, an impact calculation operation resulting in a change in severity for a given CI associated with a task can also indicate a change in the state of an SLA associated with the task, for example, by determining whether a condition of the SLA cannot be met due to the change in severity. It can therefore be determined, for example, whether an SLA condition is being met or the SLA has been breached based on the data generated by an impact calculation operation performed for resources of the CMDB.

The systems and methods of the present disclosure address problems particular to computing networks, for example, those concerning the extension of computing infrastructure resource data for management of computing infrastructure incidents. These computing network-specific issues can be solved by implementations of the present disclosure. For example, proper monitoring of SLA records in a computing infrastructure can be facilitated by extending records for CMDB object data. The development of new ways to monitor network resources to, for example, identify system impairment and indicate requiring management or attention is fundamentally related to computer networks. Implementations of the present disclosure can provide a way to efficiently manage SLA records by associating tasks related to SLAs with resources represented by nodes and service models of a CMDB.

To describe some implementations in greater detail, reference is first made to examples of hardware structures. FIG. 1 is a block diagram of an example of an electronic computing and communications system 100. As used herein, the term "electronic computing and communications system," or variations thereof, can be, or include, a distributed computing system (e.g., a client-server computing system), a cloud computing system, a clustered computing system, or the like.

The system 100 can include one or more customers 102, which may be a public entity, private entity, or other corporate entity or individual that purchases or otherwise uses services of a software provider, such as a PaaS service provider. The customer 102 can include one or more clients. For example, and without limitation, the customer 102 can include a client 104. The client 104 can comprise a computing system, which can include one or more computing devices, such as a mobile phone, a tablet computer, a laptop computer, a notebook computer, a desktop computer, or any other suitable computing device or combination of computing devices. In some implementations, the client 104 can be implemented as a single physical unit or as a combination of physical units. In some implementations, a single physical unit can include multiple clients.

The client 104 can be an instance of software running on a customer device associated with the customer 102. As used herein, the term "software" can include, but is not limited to, applications, programs, instances, processes, threads, services, plugins, patches, application version upgrades, or any other identifiable computing aspect capable of accessing or interacting with, directly or indirectly, a database. The system 100 can include any number of customers or clients or can have a configuration of customers or clients different from that generally illustrated in FIG. 1. For example, and without limitation, the system 100 can include hundreds or thousands of customers, and at least some of the customers can include or be associated with any number of clients. A customer can include a customer network or domain. For example, and without limitation, the client 104 can be associated or communicate with a customer network or domain.

The system 100 can include a datacenter 108. The datacenter 108 can include one or more servers. For example, and without limitation, the datacenter 108, as generally illustrated, includes an application server 112 and a database server 116. A datacenter, such as the datacenter 108, can represent a geographic location, which can include a facility, where the one or more servers are located. The system 100 can include any number of datacenters and servers or can include a configuration of datacenters and servers different from that generally illustrated in FIG. 1. For example, and without limitation, the system 100 can include tens of datacenters, and at least some of the datacenters can include hundreds or any suitable number of servers. In some implementations, the datacenter 108 can be associated or communicate with one or more datacenter networks or domains, which can include domains other than the client domain.

The client 104 and the servers associated with the datacenter 108 may be configured to connect to, or communicate via, a network 106. Furthermore, a client 104 associated with the customer 102 can connect to the network 106 via a communal connection point, link, or path, or using a distinct connection point, link, or path. A connection point, link, or path can be wired, wireless, use other communications technologies, or a combination thereof.

The network 106 can include, for example, the Internet and/or the network 106 can be, or include, a local area network (LAN), a wide area network (WAN), a virtual private network (VPN), or any other public or private means of electronic computer communication capable of transferring data between a client, such as the client 104, and one or more servers associated with the datacenter 108, or a combination thereof. The network 106, the datacenter 108, or any other element, or combination of elements, of the system 100 can include network hardware such as routers, switches, load balancers, other network devices, or combinations thereof. For example, the datacenter 108 can include a load balancer 110 for routing traffic from the network 106 to various servers associated with the datacenter 108.

The load balancer 110 can route, or direct, computing communications traffic, such as signals or messages, to respective elements of the datacenter 108. For example, the load balancer 110 can operate as a proxy, or reverse proxy, for a service, such as an Internet-delivered service, provided by the datacenter 108 to one or more remote clients, such as the client 104, via the network 106. Routing functions of the load balancer 110 can be configured directly or via a Domain Name System (DNS). The load balancer 110 can coordinate requests from remote clients, such as the client 104, and can simplify client access by masking the internal configuration of the datacenter 108 from the remote clients. Request coordination can include maintaining information for sessions, such as sticky sessions, between a client and a service or software provided by the datacenter 108.

Maintaining information for a sticky session can include maintaining information to forward requests associated with a session from a client to an identified element of the datacenter 108 for the session. A load balancer 110 can operate as a firewall, allowing or preventing communications based on configuration settings. Although the load balancer 110 is depicted in FIG. 1 as being within the datacenter 108, in some implementations, the load balancer 110 can instead be located outside of the datacenter 108, for example, when providing global routing for multiple datacenters. In some implementations, load balancers can be included both within and outside of the datacenter 108.

The datacenter 108 may include an application server 112 and a database server 116. The application server 112 or the database server 116 can be a computing system, which can include one or more computing devices, such as a desktop computer, a server computer, or any other computer capable of operating as a server. In some implementations, the application server 112 or the database server 116 can be non-hardware servers implemented on a physical device, such as a hardware server. In some implementations, the application server 112 and the database server 116 can be implemented as a single hardware server or as a single non-hardware server implemented on a single hardware server. Of course, any number of application servers or database servers can be implemented at the datacenter 108, and the datacenter 108 can include servers other than or in addition to the application server 112 or the database server 116, for example, a web server.

In some implementations, the application server 112 includes an application node 114, which can be a process executed on the application server 112. For example, and without limitation, the application node 114 can be executed in order to deliver services to a client, such as the client 104, as part of web application software. The application node 114 can be implemented using processing threads, virtual machine instantiations, or other computing features of the application server 112. In some implementations, the application node 114 can store, evaluate, or retrieve data from a database, such as the database 118 of the database server 116.

The application server 112 can include any suitable number of application nodes, depending upon a system load or other characteristics associated with the application server 112. For example, and without limitation, the application server 112 can include two or more nodes forming a node cluster. In some implementations, the application nodes implemented on a single application server 112 can run on different hardware servers.

The database server 116 can be configured to store, manage, or otherwise provide data for delivering services to the client 104 over a network. The database server 116 may include a data storage unit, such as a database 118, which can be accessible by software executed on the application node 114. The database 118 may be implemented as a relational database management system (RDBMS), an object database, an XML database, a CMDB, a management information base (MIB), one or more flat files, other suitable non-transient storage mechanisms, or a combination thereof. By way of non-limiting example, the system 100, in some implementations, can include an XML database and a CMDB. While limited examples are described, the database 118 can be configured as or comprise any suitable database type. Further, the system 100 can include one, two, three, or any suitable number of databases configured as or comprising any suitable database type or combination thereof.

In some implementations, the database 118 can be configured as or comprise a CMDB. A CMDB can comprise a plurality of CIs, attributes associated with the CIs, or relationships between the CIs. A CI can be a CMDB record that represents an infrastructure entity, device, or units of the system 100. For example, the customer 102, the client 104, the network 106, the datacenter 108, the load balancer 110, the application server 112, the application node 114, the database server 116, the database 118, or any other element, portion of an element, or combination of elements of the electronic computing and communications system 100 can be represented in the CMDB by a CI.

The CMDB can include information describing the configuration, the role, or both the configuration and the role, of an element of the system 100. In some implementations, an MIB can include one or more databases listing characteristics of the elements of the system 100. In some implementations, an object identifier (OID) can represent object identifiers of objects or elements in the MIB.

One or more databases (e.g., the database 118), tables, other suitable information sources, or portions or combinations thereof may be stored, managed, or otherwise provided by one or more of the elements of the system 100 other than the database server 116, such as the client 104 or the application server 112.

Some or all of the systems and techniques described herein can operate or be executed on or by the servers associated with the system 100. For example, one or more application nodes 114 can instantiate software usable by administrators of a computer network to perform discovery of computer network components and monitor states of SLAs associated with tasks or other actions to be performed with respect to those components. In some implementations, the systems and techniques described herein, portions thereof, or combinations thereof can be implemented on a single device, such as a single server, or a combination of devices, for example, a combination of the client 104, the application server 112, and the database server 116.

In some implementations, the system 100 can include devices other than the client 104, the load balancer 110, the application server 112, and the database server 116 as generally illustrated in FIG. 1. In some implementations, one or more additional servers can operate as an electronic computing and communications system infrastructure control, from which servers, clients, or both servers and clients, can be monitored, controlled, configured, or a combination thereof.

The network 106, one or more datacenters, such as the datacenter 108, and one or more load balancers, such as the load balancer 110, may be implemented within a distributed computing system. A load balancer associated with a distributed computing system (e.g., the load balancer 110) can communicate with the network 106, one or more datacenters (e.g., the datacenter 108), other load balancers, or a combination thereof. The load balancer 110 can be configured to route communications to a primary datacenter, identify a failover condition (e.g., an enumerated failover condition) at the primary datacenter, and redirect communications to a secondary datacenter until the failover condition is resolved. Although illustrated as a single unit in FIG. 1, a load balancer 110 can be implemented as multiple physical or logical units. For example, a distributed computing system can include distinct routing units, load balancing units, firewall units, or the like.

The primary datacenter can include a primary database, such as the database 118, and the secondary datacenter can include a secondary database. The secondary database can include an exact or substantially exact mirror, copy, or replication of the primary database. The primary database or the secondary database can be implemented as an RDBMS, an object database, an XML database, one or more flat files, or the like.

An application node implemented within a distributed computing environment can connect to or communicate with the primary database, which can be associated with the datacenter with which the application node is associated, or associated with another datacenter. For example, a primary datacenter can include a primary database and a first set of application nodes. A secondary datacenter can include a secondary database and a second set of application nodes. The application nodes of the first and second sets can provide a software service to remote clients, and can read or write data in the primary database. The secondary database can mirror changes made to the primary database and prevent write operations from being performed directly on the secondary database. In the event that a failover condition associated with the primary database is identified, the secondary database can operate as the primary database and can allow read or write access to data. The primary database can then operate as the secondary database, mirror the new primary database, and prevent direct write access to the new secondary database.

A distributed computing system can allocate resources of a computer network using a multi-tenant or single-tenant architecture, for example. Allocating resources in a multi-tenant architecture can include installations or instantiations of one or more servers, such as application servers, database servers, or any other server, or combination of servers, that can be shared amongst multiple customers. For example, a web server, such as a unitary Apache installation; an application server, such as a unitary Java Virtual Machine; or a single database server catalog, such as a unitary MySQL catalog, can handle requests from multiple customers. In some implementations of a multi-tenant architecture, the application server, the database server, or both can distinguish between and segregate data or other information of the various customers using the system.

In a single-tenant infrastructure (which can also be referred to as a multi-instance architecture), separate web servers, application servers, database servers, or combinations thereof can be provisioned for at least some customers or customer sub-units. Customers or customer sub-units can access one or more dedicated web servers, have transactions processed using one or more dedicated application servers, or have data stored in one or more dedicated database servers, catalogs, or both. Physical hardware servers can be shared such that multiple installations or instantiations of web servers, application servers, database servers, or combinations thereof can be installed on the same physical server. An installation can be allocated a portion of the physical server resources, such as RAM, storage, communications bandwidth, or processor cycles.

A customer instance can include multiple web server instances, multiple application server instances, multiple database server instances, or a combination thereof. The server instances can be physically located on different physical servers and can share resources of the different physical servers with other server instances associated with other customer instances. In a distributed computing system, multiple customer instances can be used concurrently. Other configurations or implementations of customer instances can also be used. The use of customer instances in a single-tenant architecture can provide, for example, true data isolation from other customer instances, advanced high availability to permit continued access to customer instances in the event of a failure, flexible upgrade schedules, an increased ability to customize the customer instance, or a combination thereof.

Figure 2:
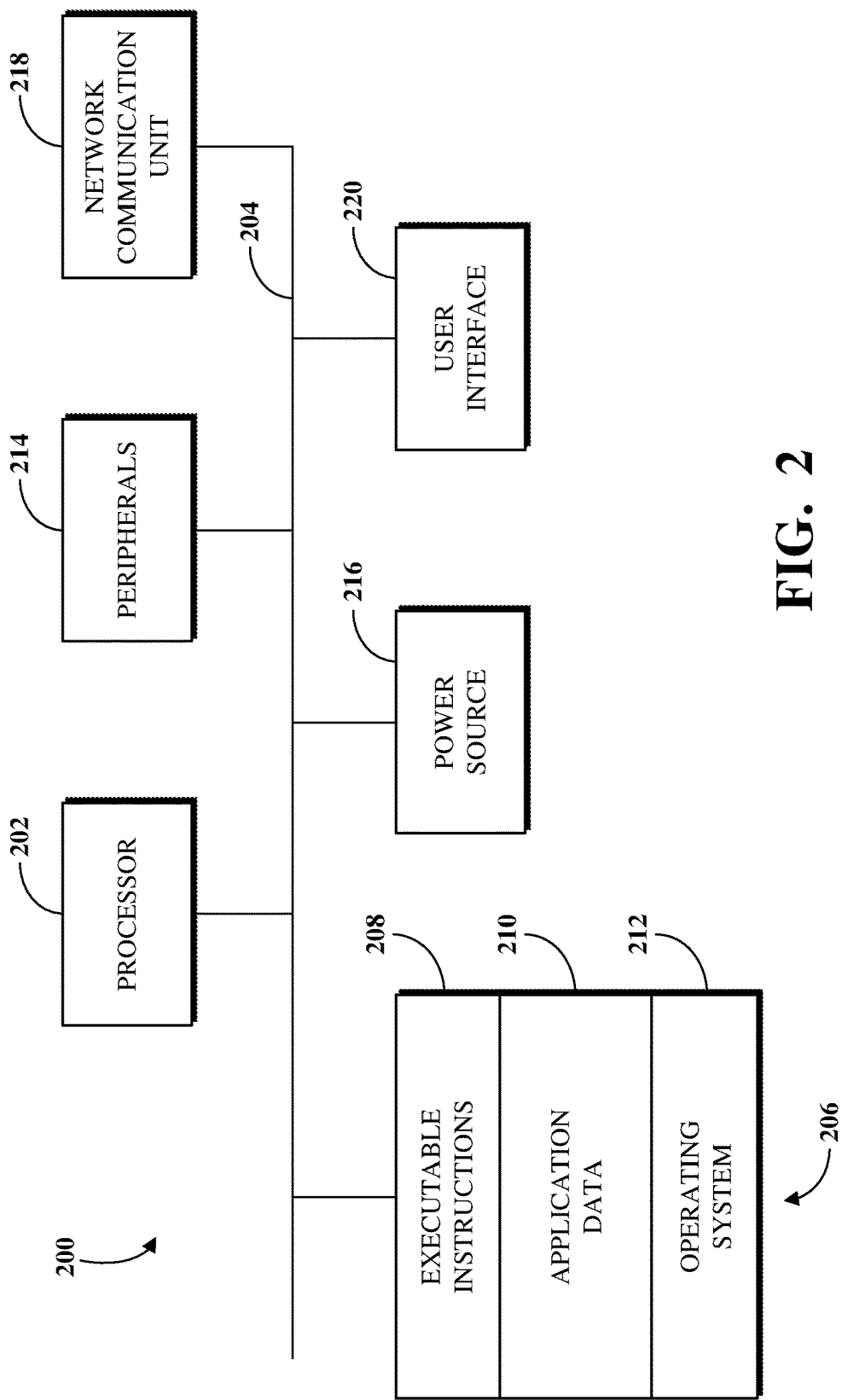
FIG. 2 is a block diagram of an example internal configuration of a computing device of an electronic computing and communications system.

FIG. 2 is a block diagram of an example of an internal configuration of a computing device 200 of an electronic computing and communications system, such as a client 104 or a server, such as an application server 112 or a database server 116, of the system 100 shown in FIG. 1. As previously described, a client or server can be a computing system including multiple computing devices or a single computing device, such as a mobile phone, a tablet computer, a laptop computer, a notebook computer, a desktop computer, a server computer, or other suitable computing devices.

A computing device 200 can include components or units, such as a processor 202, a bus 204, a memory 206, peripherals 214, a power source 216, a network communication unit 218, a user interface 220, other suitable components, or a combination thereof.

The processor 202 can be a central processing unit (CPU), such as a microprocessor, and can include single or multiple processors having single or multiple processing cores. Alternatively, the processor 202 can include another type of device, or multiple devices, now existing or hereafter developed, capable of manipulating or processing information. For example, the processor 202 can include multiple processors interconnected in any manner, including hardwired or networked, including wirelessly networked. In some implementations, the operations of the processor 202 can be distributed across multiple physical devices or units that can be coupled directly or across a local area or other suitable type of network. In some implementations, the processor 202 can include a cache, or cache memory, for local storage of operating data or instructions.

The memory 206 can include volatile memory, non-volatile memory, or a combination thereof. For example, the memory 206 can include volatile memory, such as one or more DRAM modules such as DDR SDRAM, and non-volatile memory, such as a disk drive, a solid state drive, flash memory, Phase-Change Memory (PCM), or any form of non-volatile memory capable of persistent electronic information storage, such as in the absence of an active power supply. The memory 206 can include another type of device, or multiple devices, now existing or hereafter developed, capable of storing data or instructions for processing by the processor 202. The processor 202 can access or manipulate data in the memory 206 via the bus 204.

Although shown as a single block in FIG. 2, the memory 206 can be implemented as multiple units. For example, a computing device 200 can include volatile memory, such as RAM, and persistent memory, such as a hard drive or other storage. The memory 206 can be distributed across multiple clients or servers, such as network-based memory or memory in multiple clients or servers performing the operations of clients or servers.

The memory 206 can include executable instructions 208, data, such as application data 210, an operating system 212, or a combination thereof, for immediate access by the processor 202. The executable instructions 208 can include, for example, one or more application programs, which can be loaded or copied, in whole or in part, from non-volatile memory to volatile memory to be executed by the processor 202. The executable instructions 208 can be organized into programmable modules or algorithms, functional programs, codes, code segments, or combinations thereof to perform various functions described herein. For example, the executable instructions 208 can include instructions to identify a CI that has been updated based on a change in a status of a corresponding component, associate the record with an action to be performed in accordance with a service level agreement, and identify the SLA as breached if the change in the status of the component causes the action to not be performable in accordance with the service level agreement.

The application data 210 can include, for example, user files, database catalogs or dictionaries, configuration information or functional programs, such as a web browser, a web server, a database server, or a combination thereof. The operating system 212 can be, for example, Microsoft Windows®, Mac OS X®, or Linux®, an operating system for a small device, such as a smartphone or tablet device; or an operating system for a large device, such as a mainframe computer. The memory 206 can comprise one or more devices and can utilize one or more types of storage, such as solid state or magnetic storage.

The peripherals 214 can be coupled to the processor 202 via the bus 204. The peripherals can be sensors or detectors, or devices containing any number of sensors or detectors, which can monitor the computing device 200 itself or the environment around the computing device 200. For example, a computing device 200 can contain a geospatial location identification unit, such as a global positioning system (GPS) location unit. As another example, a computing device 200 can contain a temperature sensor for measuring temperatures of components of the computing device 200, such as the processor 202. Other sensors or detectors can be used with the computing device 200, as can be contemplated. In some implementations, the power source 216 can be a battery, and the computing device 200 can operate independently of an external power distribution system. Any of the components of the computing device 200, such as the peripherals 214 or the power source 216, can communicate with the processor 202 via the bus 204. In some implementations, a client or server can omit the peripherals 214.

The network communication unit 218 can also be coupled to the processor 202 via the bus 204. In some implementations, the network communication unit 218 can comprise one or more transceivers. The network communication unit 218 can, for example, provide a connection or link to a network, such as the network 106, via a network interface, which can be a wired network interface, such as Ethernet, or a wireless network interface. For example, the computing device 200 can communicate with other devices via the network communication unit 218 and the network interface using one or more network protocols, such as Ethernet, TCP, IP, power line communication (PLC), WiFi, infrared, GPRS, GSM, CDMA, or other suitable protocols.

A user interface 220 can include a display; a positional input device, such as a mouse, touchpad, touchscreen, or the like; a keyboard; or other suitable human or machine interface devices. The user interface 220 can be coupled to the processor 202 via the bus 204. Other interface devices that permit a user to program or otherwise use the computing device 200 can be provided in addition to or as an alternative to a display. In some implementations, the user interface 220 can include a display, which can be a liquid crystal display (LCD), a cathode-ray tube (CRT), a light emitting diode (LED) display (e.g., an OLED display), or other suitable display.

Figure 3:
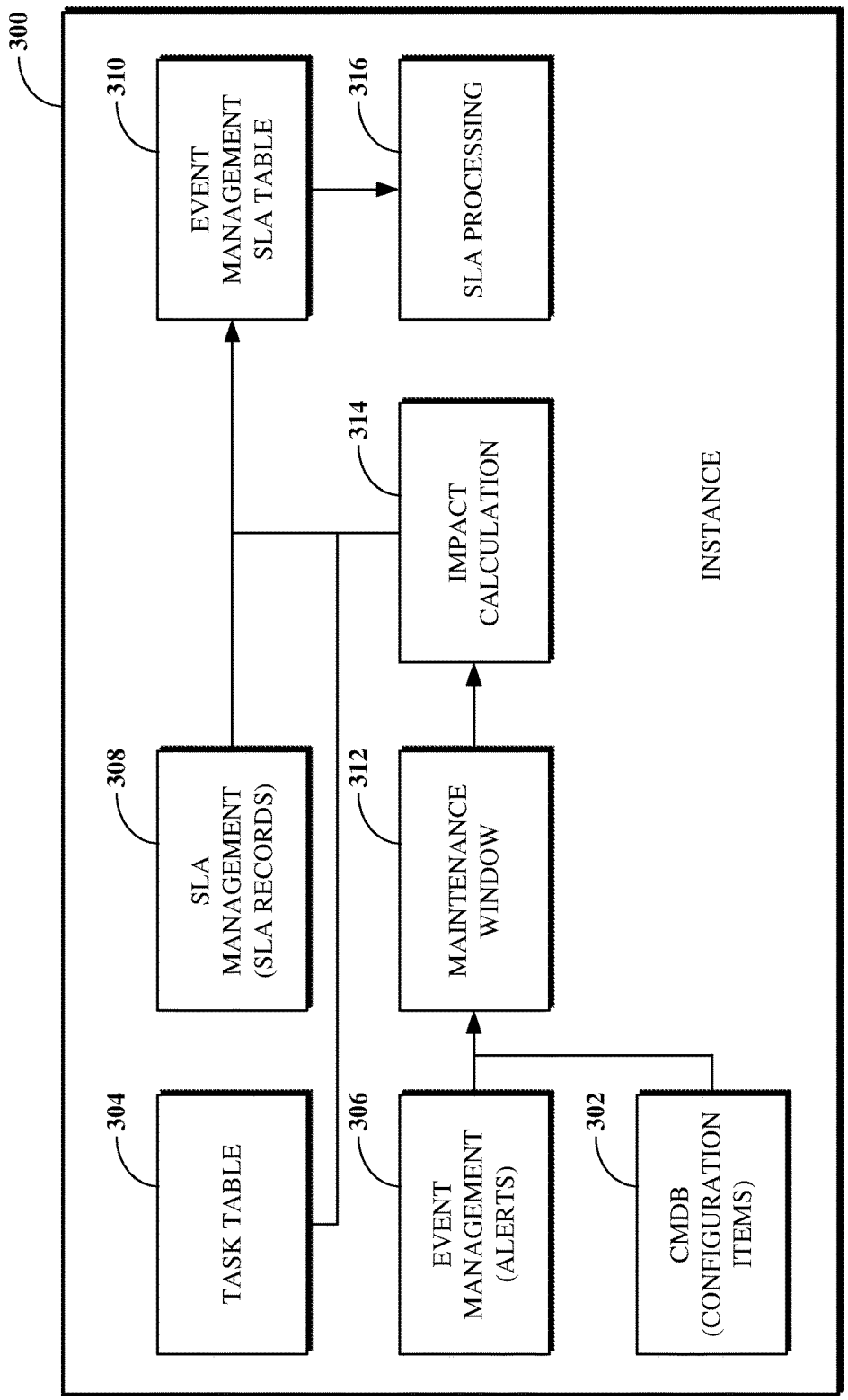
FIG. 3 is a block diagram of an example of tables and modules used in an implementation of task extension for SLA state management.

FIG. 3 is a block diagram of an example of tables and modules used in an implementation of task extension for SLA state management. The basic process of task extension of CMDB records may be performed by servers executing a cloud computing instance 300 (e.g., implemented via application nodes and databases, such as the application node 114 and the database 118 shown in FIG. 1) including a CMDB 302 populated with records (e.g., CIs) of resources within or usable by the computing network infrastructure.

A task table 304 can be a data store configured to store records of tasks (interchangeably referred to herein as "task records") generated by or for processing within the instance 300, which tasks can be indicative of an action to take or condition to occur with respect to an incident or other non-alert-type event. The task table 304 can also store or be extended to store data indicative of configuration items associated with the tasks (e.g., representing resources involved in the completion of the task), such as change data. The change data can be indicative of any change to an attribute, or property, of a CI and can be communicated by or otherwise received from an event management system, such as an event management module 306. For example, the change data can be indicative of a raw alerts communicated from the event management module 306 and associated with the configuration items (e.g., information received regarding a network resource from a source external to the computer network including the network resource, such as a third party service provider). As another example, the change data can be indicative of a changed severity of the configuration items (e.g., determined in response to the performance of an impact calculation operation based on identified alerts). The task table 304 can also store or be extended to store data indicative of SLA records associated with the task records, for example, indicating conditions for the completion of the corresponding task. The task table 304 is discussed below with respect to FIG. 5. A task record can be generated using an entry point into the CMDB 302, for example, a Uniform Resource Locator (URL) for a service model of the instance 300, and a list of credentials defining permissions for using and/or accessing the entry point. The generation of a new task can be manual (e.g., based on user selection of an alert for which to create a task) or automatic (e.g., by the system creating the task based on pre-defined alert rules and without user intervention).

Task records stored in the task table 304 can include an identifier. The identifier comprises an identification code generated based on data indicative of the task, such as a task name or source, or random data, such as a random number. However, the identifier may instead be selected from a list of available identifiers not representative of any then-currently pending tasks. Alternatively, the identifier may be determined from memory, such as the memory of a computing device on which the task was generated. The identifier can be associated with an alert (discussed below with respect to the event management module 306) upon or shortly after the identifier is generated. For example, data indicative of an alert may be identified by the event management module 306, which alert may, for example, correspond to one or more CIs within the CMDB 302. The event management module 306 can extend the task table 304 for the data indicative of an alert record by including the identifier of a generated task as part of the alert record.

The event management module 306 can be configured to monitor and manage events occurring within the instance 300, for example, by identifying alerts indicative of changes to records of the CMDB 302. Alerts can be identified based, for example, on a source that generated the alert, a type or category used by the source to identify the alert, a physical or virtual device (e.g., a resource represented by a CI, or node, of the CMDB 302) associated with the alert, a component of the device with which the alert is associated, etc. Alerts can indicate potential impairment of nodes associated with a given service model. The alerts can also or instead be identified based on the CMDB 302, event rules, and/or raw events. The CMDB 302 can include data representative of nodes of multiple service models within a customer infrastructure. The event rules can be instructive for how and when alerts are received and processed. For example, the event rules can define how often alerts should be searched for or how often identified alerts should be processed. The raw events refer to information received regarding one or more resources of the customer infrastructure, for example, external to the customer infrastructure (e.g., from a third party service provider). The raw events can include requests made for receiving or processing alerts, for example, using an application program interface (API), such as a representational state transfer API. In an implementation, alerts can indicate a physical condition of a node. For example, a server can include a temperature sensor that measures the temperature of, for example, one or more CPUs, memory, or storage. The measurement can be collected, such as directly by the server.

The CMDB 302 is a configuration management database comprising data representative of network resources of a computing network associated with the instance 300, which data may be represented within the CMDB 302 using CIs, or nodes. The CMDB 302 may also include data indicative of the relationships between the nodes. For example, the CMDB 302 can include service models, which are collections of nodes associated with a particular customer service environment (e.g., a configuration of deployed services of the computing network). For example, a service model can describe the CIs and particular relationships used to provide an email service, a web application, a financial application, or the like. The CMDB 302 can be populated, for example, by a discovery tool.

As used herein, resources can refer to infrastructure resources (e.g., hardware components, such as switches, routers, servers, modems, processors, I/O interfaces, memory or storage, power supplies, biometric readers, media readers, etc.) and/or applicative resources (e.g., software components, such as platform applications, modules, routines, firmware processes, and other instructions executable by or in connection with infrastructure resources). Resources can also refer to computing features such as documents, models, plans, sockets, virtual machines, etc. In an implementation, resources can refer to physical and/or virtual implementations of the foregoing, as applicable. The present disclosure may occasionally make specific reference, for example, to "infrastructure resources" or "applicative resources" for certain uses of resources; however, where the disclosure merely references "resources," it may refer to any of the foregoing types of resources, unless the context specifically indicates otherwise. Further, the terms "resource," "network resource," "machine" (e.g., referring to an infrastructure resource and/or an applicative resource operating in connection with an infrastructure resource), "CI," and "node" may be interchangeably used throughout this disclosure, for example, such that references to a resource of a computing infrastructure may also refer to the CMDB node or CI representing that resource and references to a CMDB node or CI may also refer to the computing infrastructure resource it represents.

An SLA management module 308 generates SLA records. The SLA management module 420 can include communicating or executing instructions for adding a generated SLA record to the task table 304 (or an extension of the task table 304, such as an event management SLA table 310, described later) configured to maintain SLA records in association with task records. An SLA record can be generated based on task record data such that the underlying SLA is based on the underlying task (e.g., the task can be to resolve an open incident within the instance 300 and the SLA can include conditions for completing the task, such as a total amount of time available for completing the task, a resource with which the task must be processed, etc.).

A maintenance window 312 can be used to review data indicative of approved CI status change records and determine the maintenance status for alerts. Alert data can be flagged within the maintenance window 312 where a CI corresponding to the alert data (e.g., because the status for the CI changed as a result of an impact calculation operation performed with respect to the alert) is also flagged within the maintenance window 312. An alert can be ignored for a CI during an impact calculation operation (e.g., not considered or used to change the status of the CI) where data indicative of a change request for the CI is flagged within the maintenance window 312. In some implementations, determining whether to flag alert data and/or ignore an alert for a CI during an impact calculation operation can be based on whether the CI and/or a change request corresponding to the CI is flagged within the maintenance window 312. The change request and alert can be related. For example, a change request for a CI can be flagged to toggle the flagging of an alert corresponding to the CI. However, this may not be the case where the change request for a CI is not approved or scheduled.

An impact calculation operation can be performed for nodes of the CMDB 302 based on alerts, for example, identified by the event management module 306. The impact calculation operation can be performed by a specialized module, for example, an impact calculation module 314, or using other instructions for processing the alert data against the CMDB 302. Generally speaking, impact calculation can refer to determining the magnitude of an effect, or severity, of identified alerts on resources of the cloud computing infrastructure of the instance 300 and the extent to which other aspects of the computer network are affected as a result. The terms "impact," "impact value," and "severity" and related terms may be used interchangeably throughout this disclosure to refer to a result of performing impact calculation and/or a previously identified or alternative severity for nodes. Further, the terms "condition" and "physical condition," when referring to a network resource such as a configuration item can refer to a value of the network resource, such as a severity existing prior to, or determined during or in response to, the performance of an impact calculation operation.

In response to performing an impact calculation operation, for example, by the impact calculation module 314 or otherwise receiving raw alert data, for example, from the event management module 306, data indicating changes in conditions for CIs for which the impact calculation operation was performed, or with which the raw alerts are associated, can be updated within the event management SLA table 310. The event management SLA table 310 can be a data store configured to store SLA records and extend the task table 304 to associate task records and SLA records. The event management SLA table 310 can be implemented in the same instance 300 as the task table 304 or in a remote instance (e.g., an instance different from that on which task table 405 is implemented). For example, the event management SLA table 310 can be implemented on a remote computing device as part of a remote, third party management tool. The use of a third party management tool may require security over rides.

Figure 4:
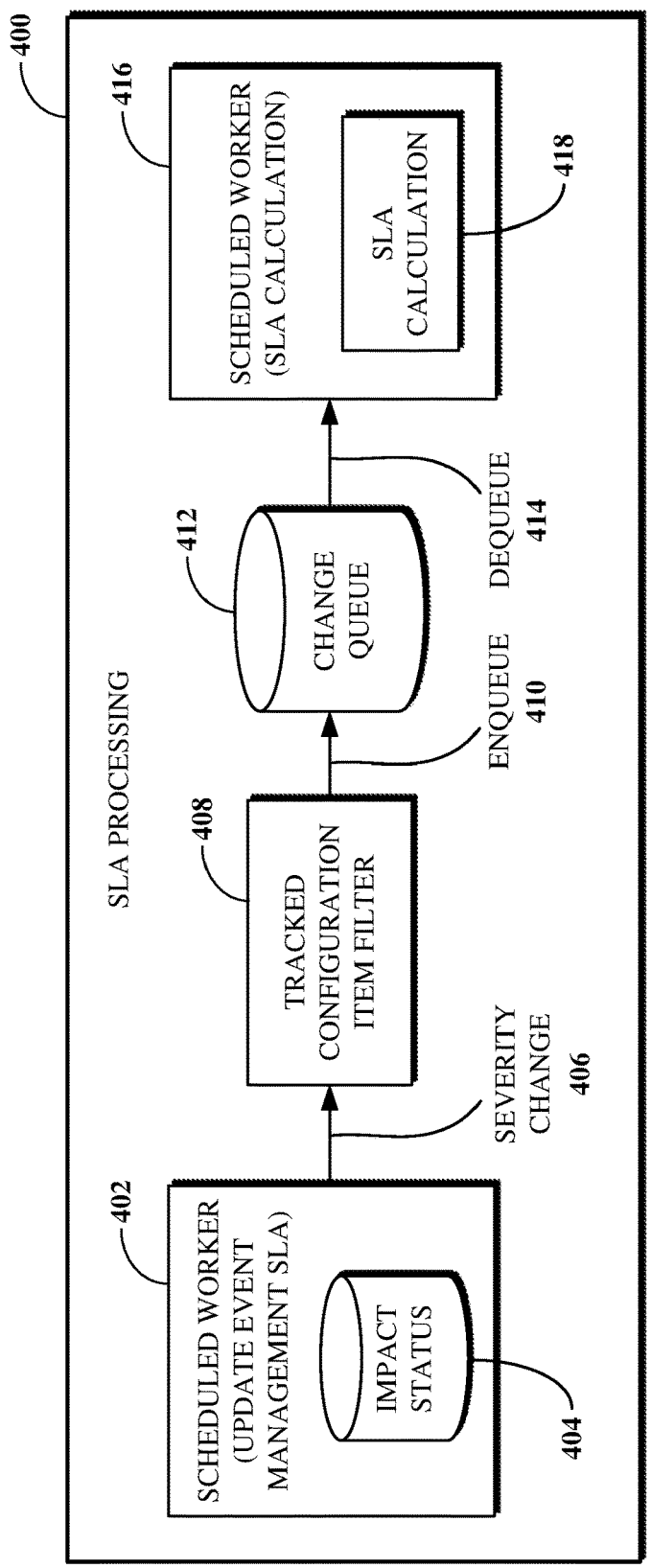
FIG. 4 is a block diagram of an example of an SLA processing module.

In response to the event management SLA table 310 updating based on data generated from the impact calculation module 314 or otherwise communicated from the event management module 306, an SLA processing module 316 can determine whether the condition of any SLA records (e.g., generated by the SLA management module 308 and stored in the event management SLA table 310) are changed (e.g., breached). FIG. 4 is a block diagram of an example of an SLA processing module 400, which may be the SLA processing module 316 shown in FIG. 3. The data processing included shown in FIG. 4 occurs within a single customer instance, such as the instance 300 shown in FIG. 3. The data processing shown in FIG. 4 occurs as a result of executing instructions for a module of the instance, such as the SLA processing module 400.

A scheduled worker 402 for event management can be configured to receive impact status data 404 indicative of severities calculated for CIs of a CMDB during or in response to the performance of an impact calculation operation. For example, the scheduled worker 402 can be configured to operate on a periodic basis (e.g., by querying for new change data each minute) or in response to receiving an indication that an impact calculation operation has been completed. The scheduled worker 402 can update the change data it receives within the task table (or an extension to the task table, such as a CI table extension or event management SLA table extension) in order to maintain severity data for nodes of the CMDB associated with task records of the task table. Updating the change data within the task table (or extension, as applicable) can comprise creating a new entry within the task table (or applicable extension) to indicate the impact status change. The status change data can be automatically logged within the task table upon the completion of the corresponding impact calculation operation. The task table can indicate when a severity for a node has been changed, for example, using a flag.

Data indicative of changes in severity for CIs can be communicated via 406 to a tracked CI filter tool 408, which can be a filter for defining or otherwise maintaining a list of conditions and CIs that are capable of impacting SLAs. The tracked CI filter tool 408 can maintain a list of CIs that have associated tasks that are also associated with SLA records, for example, in that changes to attributes of the CIs can effect conditions of the SLAs. For example, a scheduled worker configured to update a list of CIs and service models that could potentially have SLA records associated with them can be in communication with the tracked CI filter tool 408. For example, the scheduled worker can operate on a periodic basis or in response to a new CI being added to the CMDB (or a CI being modified within the CMDB, as applicable). The scheduled worker can update a CI table that extends the task table with CIs available for SLA by adding new entries to the CI table and/or removing old entries that may no longer having SLA records associated with them. In response to a CI table being updated by the scheduled worker, the CI corresponding to the update can be added to the list of CIs used by the tracked CI filter tool 408. In the event that the tracked CI filter tool 408 determines that a CI having a changed condition (e.g., where the value of an attribute of the CI has changed), or the condition itself, is capable of impacting an SLA, data indicative of a change for the CI can be enqueued at 410. The enqueued data can be communicated to a change queue 412.

The communication of the enqueued data indicative of the change for the CI occurs by the data being added to the change queue 412. The change queue 412 can use the data communicated to it to identify one or more SLA records associated with a CI corresponding to the data. For example, the change queue 412 can look up data in the task table (including extensions, as applicable) to determine whether any such data corresponds to the communicated CI data. In the event that the change queue 412 identifies an applicable SLA record, it can communicate data indicative of the identified SLA record for further processing. The communication of data indicative of an identified SLA record occurs by the data initially communicated to the change queue 412 (e.g., the enqueued data indicative of the change for the CI) being dequeued from the queue of data to be processed via 414.

Where the change queue 412 identifies an SLA record corresponding to the communicated CI data, data indicative of the identified SLA record can be communicated to a scheduled worker 416 for an SLA calculation 418. The scheduled worker 416 is configured to process the communicated SLA record data to determine whether a condition associated with the SLA of the SLA record data has been satisfied, remains pending, or has been breached. For example, an SLA associated with a service model for facilitating email service may require that the service model remain in accessible for a measurement duration of eight consecutive business hours. In the event that the impact calculation operation performed with respect to the CIs of that service model causes the severity for the service model to change to "CRITICAL" during that eight-hour time period and the service model only remains accessible if the severity is at or lower than "MAJOR," the scheduled worker 416 can determine by an SLA calculation 418 that the SLA has been breached. For example, the scheduled worker 416 can determine that a condition of the SLA cannot be met based on the data resulting from the impact calculation operation.

FIG. 5 is an illustration of an example of a task table 500. The task table 500 includes data indicative of task records, such as an identifier 504 for a task, a timestamp 506 indicative of a time at which the task was identified, and a service 508 to which the task relates. The task table 500 can be extended for storing data indicative of CIs associated with task records, such as an identifier for a CI representative of a resource involved in the completion of the task, change data indicative of a raw alert associated with or a severity of the configuration item, and a service model which includes the configuration item. The task table 500 can be extended for storing data indicative of SLA records associated with task records. For example, each row of the task table extension can be representative of an SLA record, and columns can be representative of data related to the SLA record, such as an identifier, a stage (e.g., in progress, achieved breached, cancelled, paused, completed, etc.), a planned end time indicative of a time by which the task is to be satisfied in order to avoid a breach condition of the SLA, an actual elapsed time indicative of a total amount of time elapsed since the start time, a total measurement duration indicative of the total amount of time available for satisfying the task without occurring a breach condition, an actual time left indicative of the total time remaining in the total measurement duration, etc. In some implementations, other values may also or instead be represented in extensions to the task table 500. For example, in addition to actual time values, the task table extensions can indicate business time values representative of the business schedule for satisfying the task. The business time values may differ from the actual time values, for example, where the business time values account for time during which a task was in a pause stage.

The extensions to task table 500 can be implemented in separate tables, such as a task CI table 510 and/or a task SLA table 520. In this case, a system identifier 502, 512, 522 can be included in each of the task table 500, the task CI table 510, and/or the task SLA table 520, respectively, for relating entries in each of the task table 500 and its extensions. For example, where a task record stored in the task table 500 is used for managing SLA records for CIs, the system identifier 502 associated with the task record can be used to reference corresponding entries of the task CI table 510 and the task SLA table 520, such as via the system identifier 512 or the system identifier 522, respectively. The task CI table 510 can include CI records having the system identifier 512, a CI identifier 514, a severity 516, and a service 518. The task SLA table 520 can include SLA records having the system identifier 522, an SLA identifier 524, a measurement duration 526, and a state 528. In some implementations, where the data indicative of the task records, CI records, and SLA records is stored within an object-oriented database, a single task table can be implemented for storing all of the task record, CI record, and SLA record data. For example, the task table and extensions to the task table can be or be included within a data store accessible within the computer network. References made throughout this disclosure to a data store or to the task table or extensions to the task table are non-limiting and interchangeable (to the extent possible by the system on which the table data is stored) such that each can refer to other possible implementations of the task table, unless explicitly indicated otherwise.

Figure 6A:
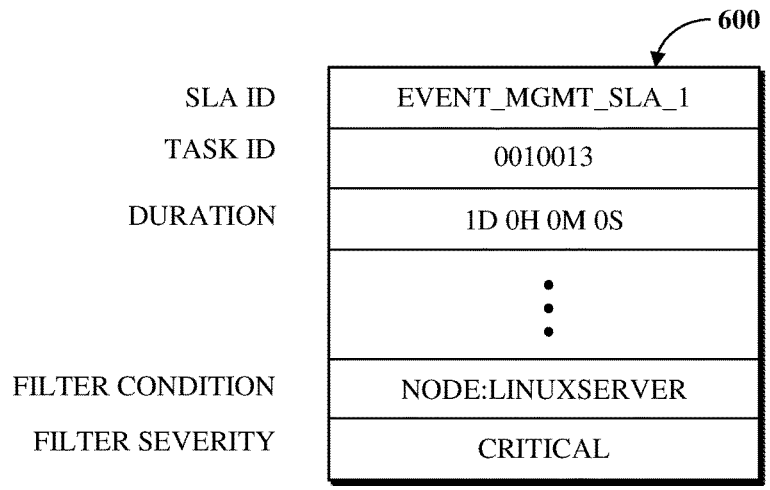
FIG. 6A is an illustration of an example of an SLA record data structure.

FIG. 6A is a block diagram of an example of an SLA record 600 data structure. The SLA record 600 contains fields with data obtained, for example, by manual user input or automatically based on characteristics of the underlying SLA, such as SLA ID (e.g., an identifier assigned to represent the SLA within an SLA management module, such as the SLA management module 308 shown in FIG. 3), task ID (e.g., an identifier indicating a task associated with the SLA record), and measurement duration (e.g., a total amount of time available for satisfying the task without the SLA occurring a breach condition). The SLA record 600 can also contain fields with data usable for changing a condition of the SLA record, such as a filter condition (e.g., some condition to be true in order for the underlying SLA to be associated with a given resource, for example, specifying that the node must be a particular resource such as a Linux® server) and a filter severity (e.g., a severity for the associated resource to have in order for the condition of the SLA record to be breached).

Figure 6B:
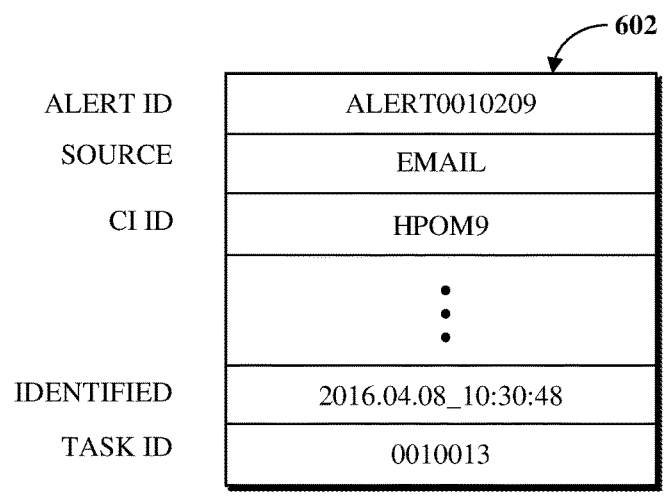
FIG. 6B is an illustration of an example of an alert record data structure.

FIG. 6B is a block diagram of an implementation of an alert record 602 data structure. The alert record 602 contains fields with data obtained, for example, upon the identification of the underlying alert (e.g., upon receipt of the alert from an event management module, such as the event management module 306 shown in FIG. 3), such as alert ID (e.g., an identifier assigned to represent the alert), source (e.g., a service or component in association with which the underlying alert was identified), node ID (e.g., an identifier of a resource within the CMDB possibly affected by the underlying alert), and a timestamp indicative of a date and/or time at which the alert was identified. The alert record 602 can also contain fields with data obtained, for example, manually by user input or automatically based on characteristics of the alert or the resources to which it pertains, such as task ID (e.g., an identifier assigned to represent a task record of a task table, such as the task table 304 shown in FIG. 3).

Figure 6C:
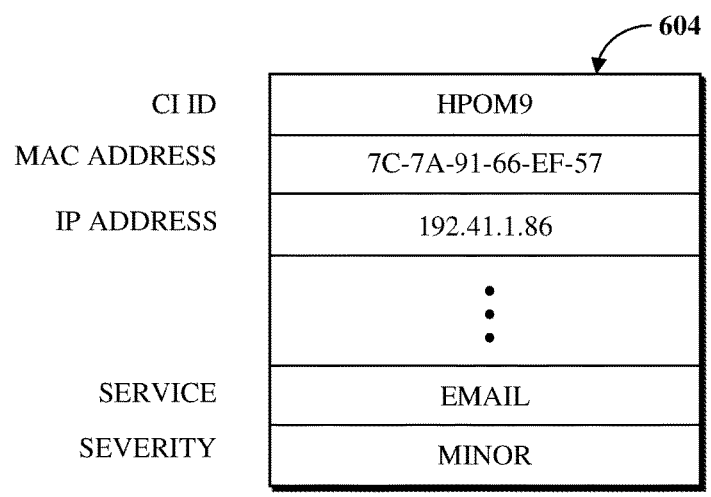
FIG. 6C is an illustration of an example of a configuration item record data structure.

FIG. 6C is a block diagram of an implementation of a CI record 604 data structure. The CI record 604 contains fields with data obtained, for example, during a discovery operation of the CMDB including the underlying resource, such as node ID (e.g., an identifier assigned to represent the resource within the CMDB), MAC address, IP address, and a service model within which the underlying resource is included. The CI record 604 can also contain fields with data obtained, for example, during other operations with respect to the CMDB (e.g., an impact calculation operation), such as severity indicating a current severity for the underlying resource (e.g., "WARNING," "MINOR," "MAJOR," OR "CRITICAL"). Other identifying data may be contained within fields of the CI record 604, for example, to indicate the node ID of a parent node of the underlying resource in the CMDB, etc.

While the SLA record 600, the alert record 602, and the CI record 604 are shown in FIGS. 6A-C, respectively, as including certain data fields, other data fields not shown or herein disclosed may also be contained within data structures for those records. Similarly, it may be the case that the data structures for those records do not include one or more of the data fields as shown or that the data structures include data fields not shown and exclude data fields that are shown.

Figure 7:
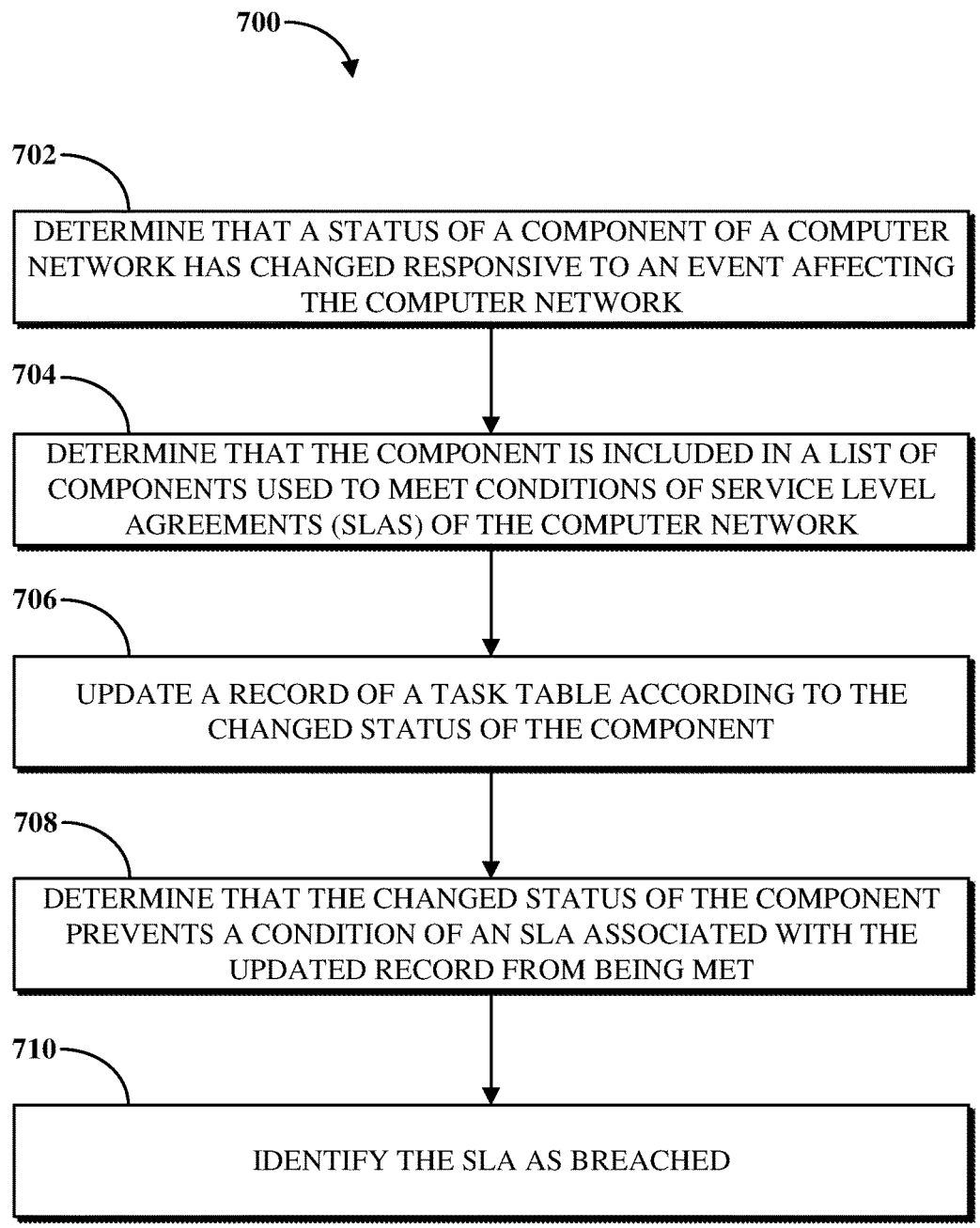
FIG. 7 is a flowchart illustrating an example of a technique for task extension for service level agreement state management.

FIG. 7 is a flowchart illustrating an example of a technique 700 for task extension for service level agreement state management, such as in the system 100 generally illustrated in FIG. 1. The technique 700 can be executed using computing devices, such as the systems, modules, and devices described with respect to FIGS. 1-6. In some implementations, the technique 700 can be performed, for example, by executing a machine-readable program or other computer-executable instructions, such as instructions or programs described according to JavaScript, C, or other such instructions. The steps, or operations, of the technique 700 or any other technique, method, process, or algorithm described in connection with the implementations disclosed herein can be implemented directly in hardware, firmware, software executed by hardware, circuitry, or a combination thereof.

In an implementation, the technique 700 includes determining that a status of a component of a computer network has changed responsive to an event affecting the computer network via 702, determining that the component is included in a list of components used to meet conditions of SLAs of the computer network via 704, updating a record of a task table according to the changed status of the component via 706, determining that the changed status of the component prevents a condition of an SLA associated with the updated record from being met via 708, and identifying the SLA as breached via 710.

At 702, change data indicating that a change in a status of a component of a computer network can be identified. This can include identifying change data indicative of one or more raw alerts capable of changing a status of a component based on its corresponding CI within a CMDB. It could also or instead include identifying other data communicated from an event management module capable of changing a condition of a CI (e.g., the event management module 306 shown in FIG. 3). For example, the identifying can include identifying change data indicative of whether any CIs have severities that have changed as a result of an impact calculation operation. Identifying the change data comprises receiving data generated in response to an impact calculation operation performed on another server. Alternatively, the identifying can comprise selecting the data from memory in response to the performance of an impact calculation, generating or calculating the data by performing the impact calculation on the server, or the like. In some implementations, the identifying at 702 may first comprise storing data indicative of changes to CI records (e.g., changes in severities) within a task table. For example, where data indicative of CI records is stored in an extension to the task table, the data indicative of the changes can be stored within fields of the extension to the task table. In response to the identification, identifiers for CIs or software services (e.g., service models) for which severities changed can be identified. For example, the change in status identified at 702 can indicate a change to a component or a software service implemented using the component. In some cases, a change in status to a software service may result in impairment to functionality of the software service.

At 704, it can be determined whether of the change in status of the component (e.g., the CI attribute that changed based on the change data identified at 702) or the component itself (e.g., the component represented by the CI for which the change data was identified at 702) are capable of impacting or otherwise affecting an SLA. The determination can be made using a filter tool, such as the CI filter tool 408 shown in FIG. 4, which maintains a list of CIs and attributes that can affect an SLA within the computer network. In some implementations, the determination can be made by querying a list of CIs that are in some way associated with one or more SLA records in the computer network for the CI associated with the status change identified at 702. Determining that the change in status of the component affects an SLA can be done to verify that a component or change in a status thereof (e.g., as identified through the change data) is relevant to SLA state management before further processing the change data identified at 702.

At 706, a table associated with the network resource record can be updated to include a record of the changed condition (e.g., caused by the change data identified at operation 702). The table updated at 706 can be a task table, as described above. Alternatively, the table updated at 706 can be a combined task table, CI table, and SLA table. Updating the task table can comprise identifying the CI table record associated with a task record in a task table and updating a field of the task record within the task table to indicate the changed condition. The updating can first include determining whether a CI is associated with a CI table record to be associated with task table data. Determining whether the CI is associated with any task table data (e.g., task records) can comprise querying the task table for task record data based on a record of the node or service model. Alternatively, determining whether the CI is associated with task table data comprises querying a task table extension (e.g., a CI table or an SLA table) for a system identifier associated with data indicative of a record of the network resource and then querying the task table for task records associated with the system identifier. In response to the determination, an identifier of a task record associated with the CI can be identified as used for the updating, such as by extending the task table to include the record of the CI table.

At 708, it can be determined whether an SLA record is associated with the record of the changed condition included in the task table at 706. For example, the task table can be queried based on the task record identifier indicated at 706 to determine whether any entries in the task table include task records having a matching identifier. Determining whether an SLA is associated with the corresponding task record can comprise querying a task table extension for a system identifier associated with data indicative of an SLA record, which system identifier corresponds to the system identifier used to identify the CI and task data discussed above. The determining at 708 may first comprise storing data indicative of changes to task records (e.g., changes in severities for the CIs or service models associated with the task records) within the task table. In response to the query, identifiers for SLA records associated with the record included in the task table updated at 706 can be identified. If any such SLA record is identified, it is determined that an SLA is associated with the record of the updated task table.

It can then be determined whether the SLA is breached based on the change data identified at 702. Determining whether an SLA is breached can be done based on the change data (e.g., indicating a raw alert associated with a configuration item or a change in severity for the CI based on an impact calculation operation) identified at 702, for example, by comparing the new severity to a condition of the SLA record. For example, where the SLA record includes a field indicating that an SLA condition is prevented from being met (or determined to be breached) if the severity of a particular node increases to "CRITICAL" and the change data indicates that the severity for that node has increased to "CRITICAL," it can be determined that the SLA condition cannot be met. In some implementations, determining whether the condition of the SLA is breached includes comparing a condition value associated with the data (e.g., the change data) to a threshold associated with the SLA record, wherein the condition of the SLA record can be considered breached if the condition value meets or exceeds the threshold. At 710, the SLA can be identified as breached responsive to the determination that the changed status of the component identified at 702 prevents the SLA condition from being met.

Although the technique 700 is shown as a series of operations for clarity, implementations of the technique 700 or any other technique, process, or algorithm described in connection with the implementations disclosed herein can be performed in various orders or concurrently. Additionally, operations in accordance with this disclosure can be performed with other operations not presented and described herein. Furthermore, one or more aspects of the systems and techniques described herein can be omitted.

An implementation includes means for determining that a status of a component of the computer network has changed responsive to an event affecting the computer network; means for determining that the component is included in a list of components used to meet conditions of the SLAs; means for updating a record of a task table according to the changed status of the component responsive to determining that the component is included in the list of components, wherein records of the task table are associated with ones of the SLAs; means for determining that the changed status of the component prevents a condition of an SLA associated with the updated record from being met; and means for identifying the SLA as breached.

An implementation includes means for determining that a component of a computer network is used to perform a task in accordance with an service level agreement (SLA) of the computer network; and means for determining that the SLA is breached responsive to a determination that a change in status of the component prevents the task from being performed in accordance with the SLA.

All or a portion of the implementations of the systems and techniques described herein can be implemented using a general-purpose computer/processor with a computer program that, when executed, carries out any of the respective techniques, algorithms, or instructions described herein. In addition, or alternatively, for example, a special-purpose computer/processor can be utilized, which can include specialized hardware for carrying out any of the techniques, algorithms, or instructions described herein.

The implementations of computing devices as described herein (and the algorithms, techniques, instructions, etc., stored thereon or executed thereby) can be realized in hardware, software, or a combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination.

For example, one or more computing devices can include an ASIC or programmable logic array (e.g., a field-programmable gate array (FPGA)) configured as a special-purpose processor to perform one or more of the operations described or claimed herein. An example FPGA can include a collection of logic blocks and random access memory (RAM) blocks that can be individually configured or configurably interconnected in order to cause the FPGA to perform certain functions. Certain FPGAs can contain other general- or special-purpose blocks as well. An example FPGA can be programmed based on a hardware definition language (HDL) design, such as VHSIC Hardware Description Language or Verilog.

The implementations disclosed herein can be described in terms of functional block components and various processing operations. Such functional block components can be realized by any number of hardware or software components that perform the specified functions. For example, the described implementations can employ various integrated circuit components (e.g., memory elements, processing elements, logic elements, look-up tables, and the like), which can carry out a variety of functions under the control of one or more microprocessors or other control devices. Similarly, where the elements of the described implementations are implemented using software programming or software elements, the systems and techniques can be implemented with any programming or scripting language, such as C, C++, Java, assembler, or the like, with the various algorithms being implemented with a combination of data structures, objects, processes, routines, or other programming elements. Functional aspects can be implemented in algorithms that execute on one or more processors. Furthermore, the implementations of the systems and techniques could employ any number of conventional techniques for electronics configuration, signal processing or control, data processing, and the like. The words "mechanism" and "element" are used broadly and are not limited to mechanical or physical implementations, but can include software routines in conjunction with processors, etc.

Likewise, the terms "module" or "monitor" as used herein and in the figures may be understood as corresponding to a functional unit implemented using software, hardware (e.g., an ASIC), or a combination of software and hardware. In certain contexts, such modules or monitors may be understood to be a processor-implemented software module or software-implemented monitor that is part of or callable by an executable program, which may itself be wholly or partly composed of such linked modules or monitors.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or semiconductor device. Other suitable mediums are also available. Such computer-usable or computer-readable media can be referred to as non-transitory memory or media, and can include RAM or other volatile memory or storage devices that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

The word "example" is used herein to mean serving as an example, instance, or illustration. Any aspect or design described herein as "example" is not necessarily to be construed as preferred or advantageous over other aspects or designs. Rather, the use of the word "example" is intended to present concepts in a concrete fashion. The use of any and all examples, or language suggesting that an example is being described (e.g., "such as"), provided herein is intended merely to better illuminate the systems and techniques and does not pose a limitation on the scope of the systems and techniques unless otherwise claimed. As used in this disclosure, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. For example, if X includes A; X includes B; or X includes both A and B, then "X includes A or B" is satisfied under any of the foregoing instances. In addition, the articles "a" and "an" as used in this disclosure and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

The particular implementations shown and described herein are illustrative examples of the systems and techniques and are not intended to otherwise limit the scope of the systems and techniques in any way. For the sake of brevity, conventional electronics, control systems, software development, and other functional aspects of the systems (and components of the individual operating components of the systems) cannot be described in detail. Furthermore, the connecting lines, or connectors, shown in the various figures presented are intended to represent example functional relationships or physical or logical couplings between the various elements. Many alternative or additional functional relationships, physical connections, or logical connections can be present in a practical device. Moreover, no item or component is essential to the practice of the systems and techniques unless the element is specifically described as "essential" or "critical."

The use of the terms "including," "comprising," "having," or variations thereof herein is meant to encompass the items listed thereafter and equivalents thereof as well as additional items. Unless specified or limited otherwise, the terms "mounted," "connected," "supported," "coupled," or variations thereof are used broadly and encompass both direct and indirect mountings, connections, supports, and couplings. Further, "connected" and "coupled" are not restricted to physical or mechanical connections or couplings.

Unless otherwise indicated herein, the recitation of ranges of values herein is intended merely to serve as a shorthand alternative to referring individually to respective separate values falling within the range, and respective separate values are incorporated into the specification as if individually recited herein. Finally, the operations of all techniques described herein are performable in any suitable order unless clearly indicated otherwise by the context.

All references, including publications, patent applications, and patents, cited herein are hereby incorporated by reference to the same extent as if respective references were individually and specifically indicated as being incorporated by reference and were set forth in its entirety herein.

The above-described implementations have been described in order to facilitate easy understanding of the present systems and techniques, and such descriptions of such implementations do not limit the present systems and techniques. To the contrary, the present systems and techniques are intended to cover various modifications and equivalent arrangements included within the scope of the appended claims, which scope is to be accorded the broadest interpretation as is permitted by law so as to encompass all such modifications and equivalent arrangements.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f)

What is claimed is:

1. A system for identifying breaches of service level agreements (SLAs) of a computer network based on changes to statuses of components of the computer network, the system comprising:
   a memory; and
   a processor,
   wherein the memory includes instructions executable by the processor to:
      determine that a status of a component of the computer network has changed responsive to an event affecting the computer network, wherein determining that the status of the component has changed comprises:
         receiving an alert associated with the component, wherein the event corresponds to the alert;
         performing impact calculation against a configuration item (CI) of a configuration management database (CMDB) based on the alert, wherein the CI represents the component within the CMDB; and
         determining that a severity of the CI has changed responsive to the impact calculation, wherein the status of the component corresponds to the severity of the CI;
      determine that the component is included in a list of components used to meet one or more conditions of an SLA with respect to a computing network task;
      update a record associated with the computing network task and the SLA with data indicative of the changed status of the component responsive to a determination that the component is included in the list of components;
      determine that the changed status of the component prevents the one or more conditions of the SLA from being met; and
      identify the SLA as breached.

2. The system of claim 1, wherein the instructions to determine that the changed status of the component prevents the one or more conditions of the SLA from being met include instructions executable by the processor to:
   determine that a definition of the condition requires an attribute of the component to have a defined value; and
   determine that a value of the changed status of the component does not reflect the defined value, wherein the changed status corresponds to the attribute.

3. The system of claim 1, wherein the instructions to determine that the changed status of the component prevents the one or more conditions of the SLA from being met include instructions executable by the processor to:
   identify the SLA by querying an SLA table for an SLA record having an identifier that matches an identifier of the component, wherein SLA records of the SLA table correspond to ones of the SLAs.

4. The system of claim 1, wherein the instructions to determine that the changed status of the component prevents the one or more conditions of the SLA from being met include instructions executable by the processor to:
   determine that functionality of a software service including the component is impaired responsive to the event; and
   determine that the impaired functionality of the software service prevents the component from meeting the condition of the SLA.

5. The system of claim 1, wherein the memory includes instructions executable by the processor to:
   define the SLA by associating values of attributes of one or more components with the condition, wherein the SLA is breached when the attributes of the one or more components do not reflect the associated values.

6. The system of claim 5, wherein the memory includes instructions executable by the processor to:
   include the one or more components within the list of components responsive to defining the SLA.

7. The system of claim 1, wherein the updated record of the task table corresponds to a software service of the computer network, wherein the component is one of a plurality of components of the computer network that is associated with the software service.

8. A method for identifying breaches of service level agreements (SLAs) of a computer network based on changes to statuses of components of the computer network, the method comprising:

determining that a status of a component of the computer network has changed responsive to an event affecting the computer network, wherein determining that the status of the component has changed comprises:
  receiving an alert associated with the component, wherein the event corresponds to the alert;
  performing impact calculation against a configuration item (CI) of a configuration management database (CMDB) based on the alert, wherein the CI represents the component within the CMDB; and
determining that a severity of the CI has changed responsive to the impact calculation, wherein the status of the component corresponds to the severity of the CI;
  determining that the component is included in a list of components used to meet one or more conditions of an SLA with respect to a computing network task;
  updating a record associated with the computing network task and the SLA with data indicative of the changed status of the component responsive to a determination that the component is included in the list of components;
  determining that the changed status of the component prevents the one or more conditions of the SLA from being met; and
  identifying the SLA as breached.

9. The method of claim 8, wherein determining that the changed status of the component prevents the one or more conditions of the SLA from being met comprises:
  determining that a definition of the condition requires an attribute of the component to have a defined value; and
  determining that a value of the changed status of the component does not reflect the defined value, wherein the changed status corresponds to the attribute.

10. The method of claim 8, wherein determining that the changed status of the component prevents the one or more conditions of the SLA from being met comprises:
  identifying the SLA by querying an SLA table for an SLA record having an identifier that matches an identifier of the component, wherein SLA records of the SLA table correspond to ones of the SLAs.

11. The method of claim 8, wherein determining that the changed status of the component prevents the one or more conditions of the SLA from being met comprises:
  determining that functionality of a software service including the component is impaired responsive to the event; and
  determining that the impaired functionality of the software service prevents the component from meeting the condition of the SLA.

12. The method of claim 8, the method comprising:
defining the SLA by associating values of attributes of one or more components with the condition, wherein the SLA is breached when the attributes of the one or more components do not reflect the associated values.

13. The method of claim 12, the method comprising:
including the one or more components within the list of components responsive to defining an SLA.

14. The method of claim 8, wherein the updated record of the task table corresponds to a software service of the computer network, wherein the component is one of a plurality of components of the computer network that is associated with the software service.

15. A non-transitory computer-readable storage medium, comprising processor-executable routines that, when executed by a processor, facilitate a performance of operations comprising:
  determining that a status of a component of a computer network has changed responsive to an event affecting the computer network, wherein determining that the status of the component has changed comprises:
    receiving an alert associated with the component, wherein the event corresponds to the alert;
    performing impact calculation against a configuration item (CI) of a configuration management database (CMDB) based on the alert, wherein the CI represents the component within the CMDB; and
    determining that a severity of the CI has changed responsive to the impact calculation, wherein the status of the component corresponds to the severity of the CI;
  determining that the component is used to perform a task in accordance with a service level agreement (SLA) of the computer network; and
  determining that the SLA is breached responsive to a determination that a change in the status of the component prevents the task from being performed in accordance with the SLA.

16. The non-transitory computer-readable storage medium of claim 15, wherein the operations for determining that the component of the computer network is used to perform the task in accordance with the SLA of the computer network comprise:
  determining that the component is included in a list of components used to meet one or more conditions of the SLA; and
  determining that the task is associated with the SLA by querying an SLA table for an SLA record having an identifier that matches an identifier of the component, wherein the SLA record corresponds to the SLA.

17. The non-transitory computer-readable storage medium of claim 15, wherein the operations for determining that the SLA is breached responsive to the determination that the change in the status of the component prevents the task from being performed in accordance with the SLA comprise:
  determining that the status of the component has changed from a first value to a second value responsive to an event affecting the computer network;
  determining that the task cannot be performed while the status of the component is the second value; and
  determining that the SLA is breached responsive to the status of the component remaining at the second value after an expiration of a measurement duration.

* * * * *